(12) United States Patent
Lo

(10) Patent No.: US 11,556,031 B2
(45) Date of Patent: Jan. 17, 2023

(54) LIGHT EMITTING DIODE DEVICE, BACKLIGHT MODULE, AND LIQUID CRYSTAL DISPLAY DEVICE HAVING SAME

(71) Applicant: ADVANCED OPTOELECTRONIC TECHNOLOGY, INC., Hsinchu Hsien (TW)

(72) Inventor: Hsing-Fen Lo, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 0 days.

(21) Appl. No.: 17/498,650

(22) Filed: Oct. 11, 2021

(65) Prior Publication Data

US 2022/0252938 A1 Aug. 11, 2022

(30) Foreign Application Priority Data

Feb. 8, 2021 (CN) .......................... 202110172736.7

(51) Int. Cl.
*G02F 1/00* (2006.01)
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133614* (2021.01)

(58) Field of Classification Search
CPC ........ G02F 1/133603; G02F 1/14; G02F 1/05; G02F 1/06
See application file for complete search history.

(56) References Cited

U.S. PATENT DOCUMENTS

| 8,445,920 | B1 | 5/2013 | Tsang | |
| 9,570,424 | B2 * | 2/2017 | Nam | H01L 33/60 |
| 10,158,054 | B1 * | 12/2018 | Lin | H01L 33/56 |
| 11,175,526 | B2 * | 11/2021 | Pierre | G02F 1/133385 |
| 11,251,225 | B2 * | 2/2022 | Cha | H01L 33/52 |
| 2009/0085467 | A1 * | 4/2009 | Jang | H05B 33/14 313/503 |
| 2009/0152582 | A1 * | 6/2009 | Chang | H01L 33/507 257/E33.061 |
| 2014/0233212 | A1 * | 8/2014 | Park | G02F 1/133617 362/361 |
| 2016/0315229 | A1 * | 10/2016 | Dai | H01L 33/504 |
| 2021/0167256 | A1 * | 6/2021 | Wang | H01L 33/504 |
| 2021/0367126 | A1 * | 11/2021 | Hong | H01L 33/641 |
| 2022/0019012 | A1 * | 1/2022 | Li | C09K 11/7731 |

FOREIGN PATENT DOCUMENTS

| TW | M436795 | U1 | 9/2012 |
| TW | 201327938 | A1 | 7/2013 |
| TW | M580691 | U | 7/2019 |
| TW | 201933630 | A | 8/2019 |

* cited by examiner

*Primary Examiner* — Gerald J Sufleta, II
(74) *Attorney, Agent, or Firm* — ScienBiziP, P.C.

(57) ABSTRACT

A light emitting diode device includes a substrate, a reflector cup on the substrate and defining cavity, a light-emitting chip on the substrate and in the cavity, fluorescent glue filling the cavity and covering the light-emitting chip, and a phosphor film on a side of the reflector cup away from the substrate. The light-emitting chip is surrounded by the reflector cup. The fluorescent glue includes fluorescent powder and transparent glue.

17 Claims, 5 Drawing Sheets

LIGHT EMITTING DIODE DEVICE, BACKLIGHT MODULE, AND LIQUID CRYSTAL DISPLAY DEVICE HAVING SAME

FIELD

The subject matter herein generally relates to display field, particularly relates to a light emitting diode device, a backlight module using the light emitting diode device and a liquid crystal display device.

BACKGROUND

A liquid crystal display device usually includes a display module and a backlight module configured for providing backlight for the display module. The backlight module usually uses light-emitting diodes as a light source. A conventional light emitting diode packaging structure includes a blue chip, a packaging glue covering the blue chip, and a red-green phosphor film on the packaging glue. However, the packaging efficiency of the light-emitting diode packaging structure is only 80%, and a concentration of the red-green phosphor film is at least three times that of the general packaging components, which increases the cost of the light-emitting diode packaging structure.

BRIEF DESCRIPTION OF THE DRAWINGS

Implementations of the present technology will now be described, by way of embodiments only, with reference to the attached figures.

DETAILED DESCRIPTION

Figure 1:
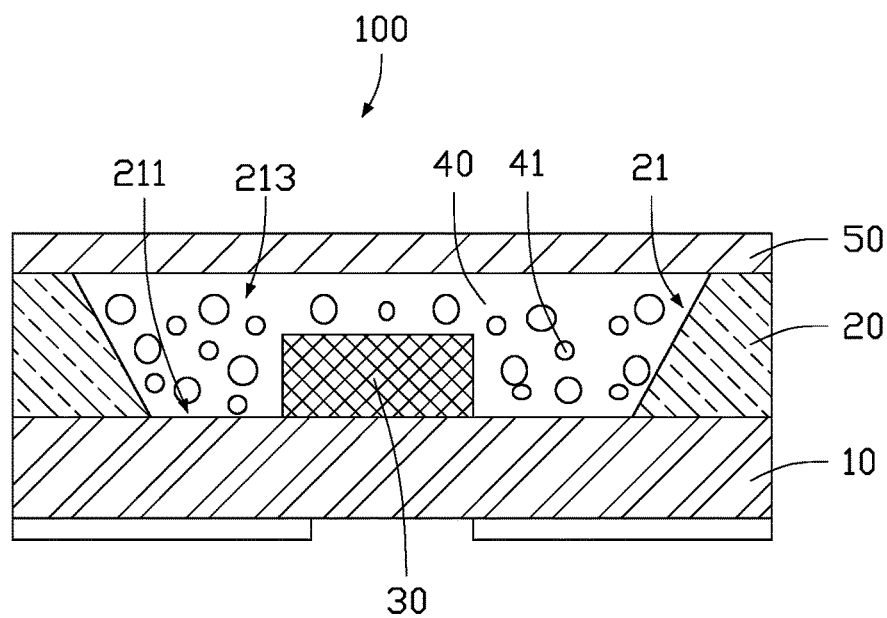
FIG. 1 is a cross-sectional view of a light emitting diode device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

FIG. 1 illustrates a light emitting diode device 100. The light emitting diode device 100 includes a substrate 10, a reflector cup 20, at least one light-emitting chip 30, and fluorescent glue 40. The reflector cup 20, the at least one light-emitting chip 30, and the fluorescent glue 40 are on a same surface of the substrate 10. The reflector cup 20 substantially has a shape of a cup, and has a cavity 21. The cavity 21 includes a lower opening 211 adjacent to the substrate 10 and an upper opening 213 away from the substrate 10. The lower opening 211 is opposite to and spaced apart from the upper opening 213. An area of the upper opening 213 is greater than an area of the lower opening 211. The cavity 21 gradually increases in size along a direction from the lower opening 211 to the upper opening 213.

The light-emitting chip 30 is located on the substrate 10 and in the cavity 21 of the reflector cup 20. The light-emitting chip 30 is surrounded by the reflector cup 20. The light-emitting chip 30 is located approximately at a center of the lower opening 211. The light-emitting chip 30 is configured to emit light. In this embodiment, the light-emitting chip 30 is a chip for emitting blue light. The inner wall of reflector cup 20 defining the cavity 21 is a reflective surface, so light emitted by the light-emitting chip 30 is reflected by the inner wall of the reflecting cup 20 and emitted from the upper opening 213. The material of the reflector cup 20 itself is opaque.

The surface of the substrate 10 on which the light-emitting chip 30 is located is provided with a circuit pattern (not shown), the light-emitting chip 30 having a conductive portion (not shown). The circuit pattern of the substrate 10 is electrically connected to the conductive portion to provide power for the light-emitting chip 30.

The reflector cup 20 may include a metal material or a non-metal material. The metal material may include at least one selected from titanium, gold, aluminum, silver, platinum, and palladium. The non-metallic material can be selected from polyphthalamide, polycarbonate, and ceramics. The non-metallic material may also be a polymer material doped with reflective material, wherein the doped reflective material includes a reflective non-metallic material or a reflective metallic material. It is understandable that in other embodiments, the reflector cup 20 may also be made of a material without a reflective function, but with reflective material formed on the wall of the cavity 21 of the reflector cup 20.

The fluorescent glue 40 fills the cavity 21 of the reflective cup 20 and covers the light-emitting chip 30. The fluorescent glue 40 includes fluorescent powder and transparent glue, the transparent glue is preferably a transparent silica gel. The transparent silica gel has good thermal conductivity, which not only provides a good heat dissipation for the light-emitting chip 30, but also protects the light-emitting chip 30.

The fluorescent glue 40 further includes light diffusion particles 41 to evenly diffuse light. The light diffusion particles 41 may be BN, $TiO_2$, or ZrO. The light diffusion particles 41 can increase luminous efficiency by at least 10%.

Generally speaking, if light diffusion particles 41 with a small particle size are used, a weight ratio of the light diffusion particles 41 in the fluorescent glue 40 needs to be greater, so that a better light mixing effect can be achieved. In the present embodiment of this disclosure, the fluorescent glue 40 can contain light diffusing particles 41 with a weight ratio of 0.1% to 20%. Preferably, when the light diffusion particles 41 having a particle size of 1-30 microns are used, the weight ratio of the light diffusion particles 41 is 0.2% to 10%.

The fluorescent glue 40 has a full width at half maximum of 25 nm to 90 nm. Full width at half maximum refers to the full width of the band when the height of the absorption band is half of the maximum height. The fluorescent glue 40 emits light having a wavelength of 600 nm to 660 nm when excited by blue light.

As shown in FIG. 1, the light emitting diode device 100 further includes a phosphor film 50 on a side of the reflector cup 20 away from the substrate 10. The phosphor film 50 completely covers the upper opening 213 of the reflector cup 20. An area of the phosphor film 50 is greater than an opening area of the upper opening 213. The fluorescent glue 40 is between the phosphor film 50 and the light-emitting chip 30, so the phosphor film 50 is largely insulated from heat generated by the light-emitting chip 30. A stable luminous efficiency is thus achieved.

The phosphor film 50 may include at least one selected from perovskite, organic dyes, inorganic luminophores, and $SrGa_2S_4$: Eu/r-AlON material.

The phosphor film 50 has a full width at half maximum of 25 nm to 55 nm, and has an emission wavelength of 520 nm to 550 nm when excited by the blue light.

The substrate 10 can be made of a material selected from glass, ceramic, bakelite, epoxy resin, polyethylene terephthalate, polyimide, cyanoester, bismaleic imide/trinitrogen trap, glass fiber flame-resistant laminated board fourth grade material (FR4) and glass fiber flame-resistant laminated board fifth grade material (FR5).

In one embodiment, the fluorescent glue 40 contains red fluorescent powder, the phosphor film 50 contains green fluorescent powder.

In the embodiment of the present disclosure, three-color frequency white light can be obtained from the fluorescent glue 40 and the phosphor film 50 when the light-emitting chip 30 emits blue light. The luminous efficiency can be increased by 10% by adding light diffusion particles 41 into the fluorescent glue 40, the overall packaging efficiency of the light-emitting diode device 100 increases to not less than 90%. Since the phosphor film 50 is attached to the surface of the fluorescent glue 40 away from the light-emitting chip 30, package life is increased.

Figure 2:
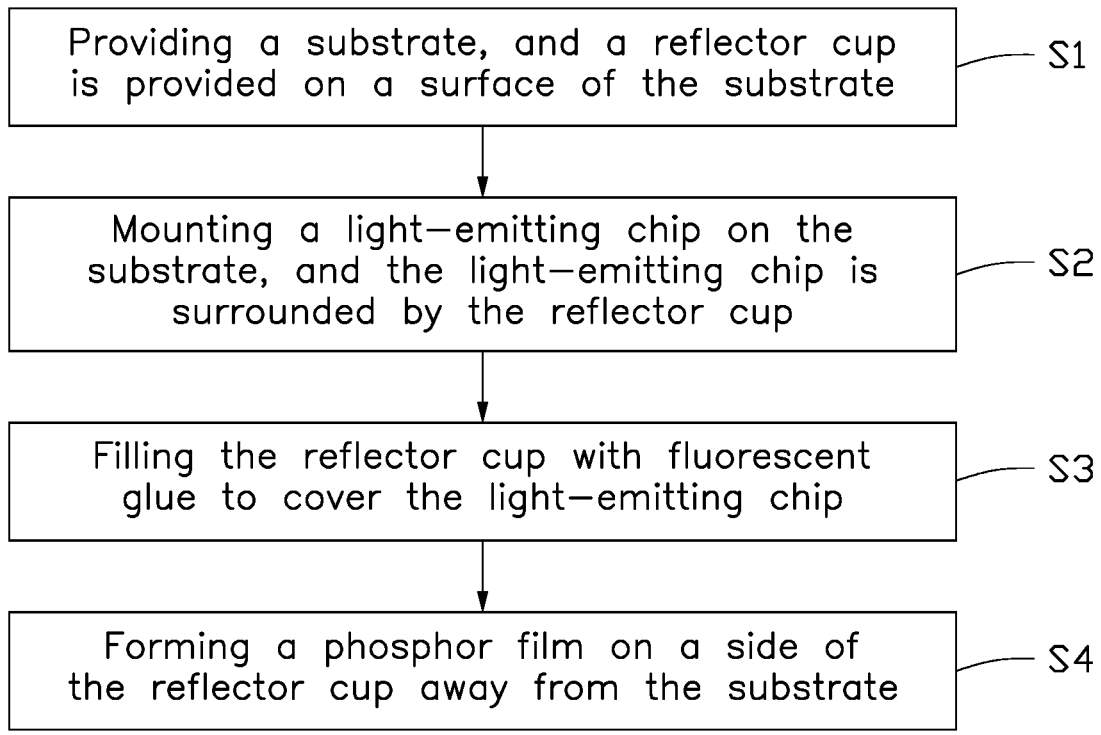
FIG. 2 is a flowchart of a method for making the light emitting diode device.

FIG. 2 shows a making method of the light emitting diode device 100 of the present disclosure which includes the following steps.

Step S1: providing a substrate 10, and a reflector cup 20 on a surface of the substrate 10.

Step S2: mounting a light-emitting chip 30 on the substrate 10, the light-emitting chip 30 being surrounded by the reflector cup 20.

Step S3: filling the reflector cup 20 with fluorescent glue 40 to cover the light-emitting chip 30.

Step S4: forming a phosphor film 50 on a side of the reflector cup 20 away from the substrate 10.

Figure 3:
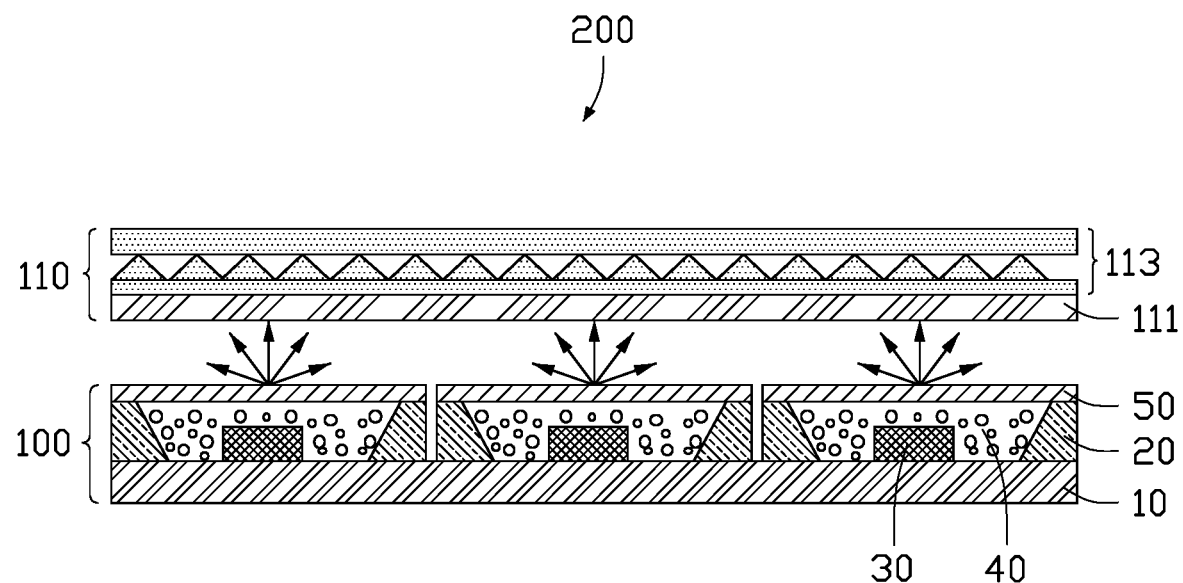
FIG. 3 is a cross-sectional view of a backlight module having the light emitting diode device according to a first embodiment of the present disclosure.

As shown in FIG. 3, the present disclosure also provides a backlight module 200 having the above-mentioned light emitting diode device 100. The backlight module 200 further includes optical films 110 stacked on a side of the light emitting diode device 100 having the phosphor film 50. The optical films 110 may include an optical diffusion sheet 111, a brightening film 113, and so on. A plurality of reflector cups 20 and a plurality of light-emitting chips 30 are provided on the substrate 10 of the light emitting diode device 100.

Figure 4:
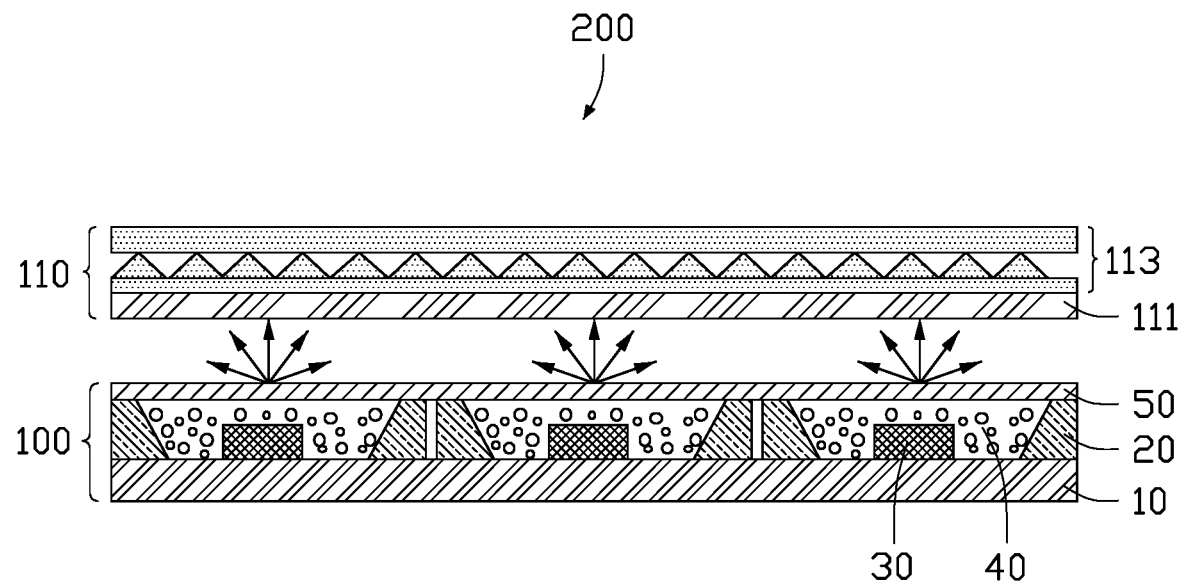
FIG. 4 is a cross-sectional view of a backlight module of a light-emitting diode device according to a second embodiment of the present disclosure.

FIG. 4 illustrates a light emitting diode device 200 of another embodiment. The backlight module 200 shown in FIG. 4 is basically the same as the backlight module 200 shown in FIG. 3, the difference is that the phosphor film 50 in FIG. 4 is a continuous layer, and the backlight module 200 shown in FIG. 3 includes a plurality of phosphor films 50 spaced apart from each other.

Figure 5:
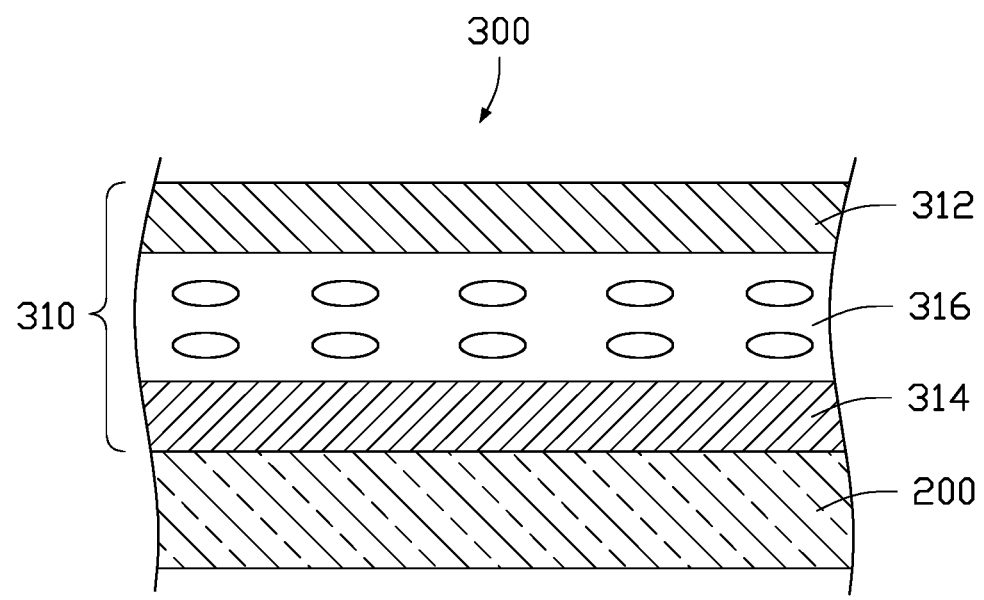
FIG. 5 is a cross-sectional view of a liquid crystal display device using a backlight module.

FIG. 5 illustrates a liquid crystal display device 300 using the above-mentioned light emitting diode device 100. The liquid crystal display device 300 includes the backlight module 200 and a liquid crystal display panel 310 stacked on a side of the backlight module 200. The liquid crystal display panel 310 includes an opposite substrate 312 and a thin film transistor array substrate 314 opposite to each other, and a liquid crystal layer 316 between the opposite substrate 312 and the thin film transistor array substrate 314. The thin film transistor array substrate 314 is relatively close to the backlight module 200, and the optical films 110 of the backlight module 200 is located between the thin film transistor array substrate 314 and the light emitting diode device 100.

EXAMPLE 1

A plurality of reflector cups 20 and a plurality of blue light chips are arranged on the substrate 10, each reflector cup 20 is filled with fluorescent glue 40 and the fluorescent glue 40 covers the blue light chip. The fluorescent glue 40 contains red fluorescent powder, and a green phosphor film 50 covering the fluorescent glue 40 is provided on each reflector cup 20.

COMPARATIVE EXAMPLE 1

A plurality of reflector cups 20 and a plurality of blue light chips are arranged on the substrate 10, and a red-green phosphor film 50 covers the reflector cups 20.

COMPARATIVE EXAMPLE 2

A plurality of reflector cups 20 and a plurality of blue light chips are arranged on the substrate 10, each reflector cup 20 is filled with fluorescent glue 40 and the fluorescent glue 40 covers the blue light chip, and the fluorescent glue 40 includes a green fluorescent powder (β-SiAlon: 540 nm) and KSF phosphor.

The light-emitting diode devices of the example 1 and the comparative examples 1-2 were used as the light source of the direct-type backlight module. The diffusion film, the brightness enhancement film, and the reflective brightness enhancement film were sequentially stacked on a side of the three types of light-emitting diode devices to form three different backlight modules. Test results of the three backlight modules are shown in the Table 1 below.

TABLE 1

|  | Brightness | NTSC gamut | Phosphor concentration |
| --- | --- | --- | --- |
| Comparative Example 1 | 80% | 115% | 300% |
| Comparative Example 2 | 100% | 100% | 100% |
| Example 1 | 90% | 115% | 150% |

According to Table 1, compared with comparative examples 1 and 2, the light-emitting diode device of the example 1 has higher brightness and can achieve a higher color gamut when the phosphor concentration is moderate.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A light emitting diode device, comprising:
a substrate;
a reflector cup on the substrate and defining a cavity;
at least one light-emitting chip on the substrate and in the cavity of the reflector cup; the at least one light-emitting chip being surrounded by an inner wall of the reflector cup;
fluorescent glue in the cavity and covering the at least one light-emitting chip, the fluorescent glue comprising fluorescent powder and transparent glue; and
a phosphor film on a side of the reflector cup away from the substrate;
wherein the inner wall is a reflective surface; the reflector cup is made of a polymer material doped with reflective material.

2. The light emitting diode device of claim 1, wherein the cavity comprises a lower opening adjacent to the substrate and an upper opening opposite to and spaced apart from the upper opening; and an area of the upper opening is greater than an area of the lower opening.

3. The light emitting diode device of claim 2, wherein opening of the cavity gradually increases from the lower opening to the upper opening.

4. The light emitting diode device of claim 1, wherein the fluorescent glue further comprises light diffusion particles.

5. The light emitting diode device of claim 1, wherein the fluorescent glue has a full width at half maximum of 25 nm to 90 nm; and the fluorescent glue is configured to emit light having a wavelength of 600 nm to 660 nm after being excited by blue light.

6. The light emitting diode device of claim 1, wherein the phosphor film has a full width at half maximum of 25 nm to 55 nm; and the phosphor film is configured to emit light having a wavelength of 520 nm to 550 nm after being excited by blue light.

7. The light emitting diode device of claim 1, wherein the at least one light-emitting chip is configured to emit blue light.

8. The light emitting diode device of claim 1, wherein the fluorescent glue comprises red fluorescent powder, and the phosphor film comprises green fluorescent powder.

9. A backlight module, comprising:
a light emitting diode device, the light emitting diode device comprising:
a substrate;
a reflector cup on the substrate and defining a cavity;
at least one light-emitting chip on the substrate and in the cavity of the reflector cup; the at least one light-emitting chip being surrounded by an inner wall of the reflector cup;
fluorescent glue in the cavity and covering the light-emitting chip, the fluorescent glue comprising fluorescent powder and transparent glue; and
a phosphor film on a side of the reflector cup away from the substrate; and
optical films, the optical films stacked on a side of the light emitting diode device having the phosphor film;
wherein the inner wall is a reflective surface; the reflector cup is made of a polymer material doped with reflective material.

10. The backlight module of claim 9, wherein the cavity comprises a lower opening adjacent to the substrate and an upper opening opposite to and spaced apart from the upper opening; and an area of the upper opening is greater than an area of the lower opening.

11. The backlight module of claim 10, wherein opening of the cavity gradually increases from the lower opening to the upper opening.

12. The backlight module of claim 9, wherein the fluorescent glue further comprises light diffusion particles.

13. The backlight module of claim 9, wherein the fluorescent glue has a full width at half maximum of 25 nm to 90 nm; and the fluorescent glue is configured to emit light having a wavelength of 600 nm to 660 nm after being excited by blue light.

14. The backlight module of claim 9, wherein the phosphor film has a full width at half maximum of 25 nm to 55 nm; and the phosphor film is configured to emit light having a wavelength of 520 nm to 550 nm after being excited by blue light.

15. The backlight module of claim 9, wherein the at least one light-emitting chip is configured to emit blue light.

16. The backlight module of claim 9, wherein the fluorescent glue comprises red fluorescent powder, and the phosphor film comprises green fluorescent powder.

17. A liquid crystal display device, comprising:
a backlight module, the backlight module, comprising:
a light emitting diode device, the light emitting diode device comprising:
a substrate;
a reflector cup on the substrate and defining a cavity;
at least one light-emitting chip on the substrate and in the cavity of the reflector cup; the at least one light-emitting chip being surrounded by an inner surface of the reflector cup;
fluorescent glue in the cavity and covering the light-emitting chip, the fluorescent glue comprising fluorescent powder and transparent glue; and
a phosphor film on a side of the reflector cup away from the substrate; and
optical films, the optical films stacked on a side of the light emitting diode device having the phosphor film; and
a liquid crystal display panel stacked on a side of the backlight module having the optical films;
wherein the inner wall is a reflective surface; the reflector cup is made of a polymer material doped with reflective material.

* * * * *